United States Patent [19]

Edlund et al.

[11] Patent Number: 4,513,393

[45] Date of Patent: Apr. 23, 1985

[54] DOCUMENT HANDLING TERMINAL COMPUTER

[75] Inventors: Olof A. Edlund; Mats A. Ensér, both of Lidingo; Jan W. Strage, Sollentuna; Svante B. Thunberg; Erik I. Wallmark, both of Lidingo, all of Sweden

[73] Assignee: International Business Machines Corporation, Armonk, N.Y.

[21] Appl. No.: 383,669

[22] Filed: Jun. 1, 1982

[30] Foreign Application Priority Data

Jun. 11, 1981 [EP] European Pat. Off. ........ 81850108.2

[51] Int. Cl.³ .......................... G06F 3/04; G06F 15/30
[52] U.S. Cl. .................................. 364/900; 364/408; 235/425
[58] Field of Search ... 364/200 MS File, 900 MS File, 364/406, 478; 239/449

[56] References Cited

U.S. PATENT DOCUMENTS

| | | | |
|---|---|---|---|
| 3,312,949 | 4/1967 | Henig | 364/900 |
| 3,454,936 | 7/1969 | Bridge et al. | 364/200 |
| 3,573,748 | 4/1971 | Holme | 364/200 |
| 3,609,694 | 9/1971 | Brenner | 364/900 |
| 3,895,716 | 7/1975 | Ugo | 364/900 |
| 4,082,945 | 4/1978 | Goor et al. | 235/419 |
| 4,093,981 | 6/1978 | McAllister et al. | 364/200 |
| 4,093,999 | 6/1978 | Fuller et al. | 364/900 |
| 4,205,780 | 6/1980 | Burns et al. | 235/449 |
| 4,228,495 | 10/1980 | Bernhard et al. | 364/200 |
| 4,404,649 | 9/1983 | Nunley et al. | 364/900 |

FOREIGN PATENT DOCUMENTS

| | | |
|---|---|---|
| 0027246 | 7/1980 | European Pat. Off. |
| 2001462 | 7/1978 | United Kingdom |

Primary Examiner—Gareth D. Shaw
Assistant Examiner—Daniel K. Dorsey
Attorney, Agent, or Firm—Karl O. Hesse

[57] ABSTRACT

A document handling terminal is disclosed having a read unit, a printer, an inscriber and an endorser unit, a printer, an inscriber and an endorser unit. A microprocessor in the terminal controls the operation of the various input output units by means of an operation control table loaded into said microprocessor from a host computer. A plurality of instructions in the table are executed in a sequence without branches or jumps by comparing a condition field in each instruction to information stored in a condition register. If the comparison indicates equal, the operation code of the instruction is executed, otherwise not. The execution of an instruction controls data transfer within a buffer store, between the buffer store and input output registers, the setting of operation indicators and changing of data in the condition register. The input output units are selectively operated according to the state of the operation indicators asynchronous to execution of the instructions.

4 Claims, 7 Drawing Figures

DOCUMENT HANDLING TERMINAL COMPUTER

FIELD OF THE INVENTION

The present invention relates to a document handling terminal computer system and more particularly to a document reader/printer work station attached to a host system over a communication link.

BACKGROUND OF THE INVENTION

It is known in the art to use a terminal system including a plurality of work stations with attached peripheral units, connected to a host over a communication link. These units are provided with specific computing intelligence for handling various tasks. Such a system tends to be expensive and complex.

One solution to these problems is presented in the published GB patent application No. GB2001462, inventor Briggs et al. In this document there is described a terminal system provided with a master terminal with computing facility, attached to a host over a first communication link, and a plurality of slave terminals attached to the master terminal over a second communication link. This system reduces the complexity of the slave terminals, however, the overall communication between the various units and the host will still be complex and the link between the master terminal and the host tends to be heavily loaded. This problem becomes especially evident if the terminal work stations are used in banking environments where a main controller in a host system is attached to a plurality of work stations over a relatively slow loop transmission link.

SUMMARY OF THE INVENTION

According to the present invention a terminal system is provided comprising a host, a communication link and a work station including a document reader/printer with a base engine, a powerful micro processor, controlling a number of slave adapters attaching the various input/output units of the reader/printer to the system. The base engine is loaded from the host with an operation table controlling the operation of the various slave adapters.

The invention is more specifically defined in the attached claims.

One advantage of the present invention is that the required communication time between a terminal work station and the host controller is reduced.

Another advantage of the invention is that a rather slow communication link can be used between the host controller and the terminal work station. Still another advantage of the invention is that the computing equipment in the terminal work station is rather simple and non-expensive. Another advantage of the invention is that a work station can be provided with high degree of computing intelligence without using complex equipment. Still another advantage of the invention is that all instructions in the base engine are executed sequentially without branches and without the need of an instruction counter.

The invention will now be described in detail with reference to the attached drawings.

A PREFERRED EMBODIMENT OF THE INVENTION

Figure 1:
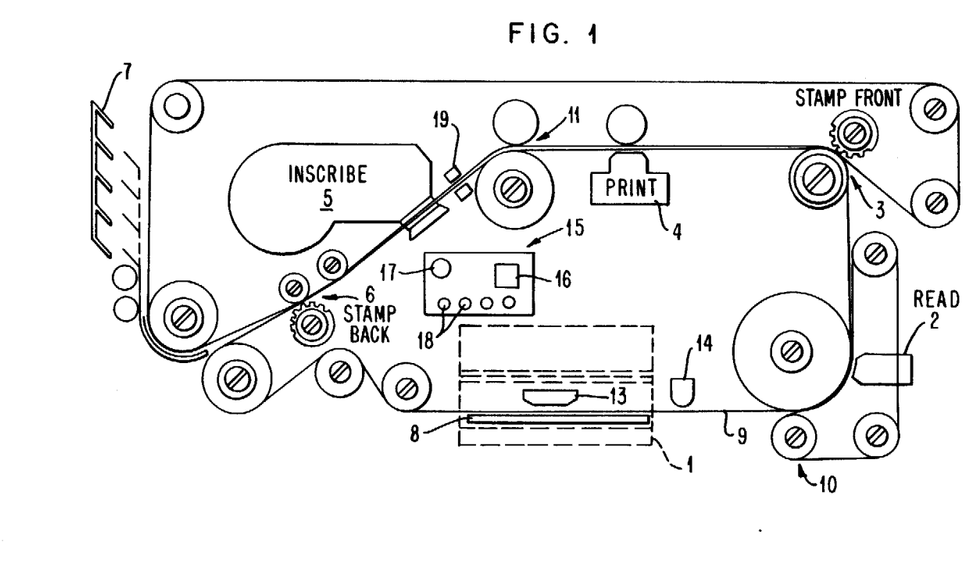
FIG. 1 is a schematic illustration of a document reader/printer according to the invention.

According to FIG. 1 the document reader/printer comprises a document hopper 1 for receiving one or a number of documents 8. A sensor 13 in the hopper 1 senses the presence of a document 8 in order to start a drive motor (not shown) to move the document 8 out of the hopper 1, along a document travel path 9. The document 8 will first pass under a zero point sensor 14, which will be used to synchronize the document moving speed with the operation of the various input/output units in the reader/printer. The document will then travel through a pair of feed rolls 10 to a reading station 2. From the reading station 2 the document continues to a stamp front station 3 and further to a print station 4. From the print station 4 the document passes between a pair of feed rolls 11, a second sensor 19 to an inscriber 5 and further to a stamp back station 6. From the stamp back station 6 the document will pass over a pair of feed rolls to a stacker 7.

The operation of the document reader/printer can be controlled from an operator panel 15 including a mode rotary switch 17, a numeric display 16 and a plurality of indicators 18.

Figure 2:
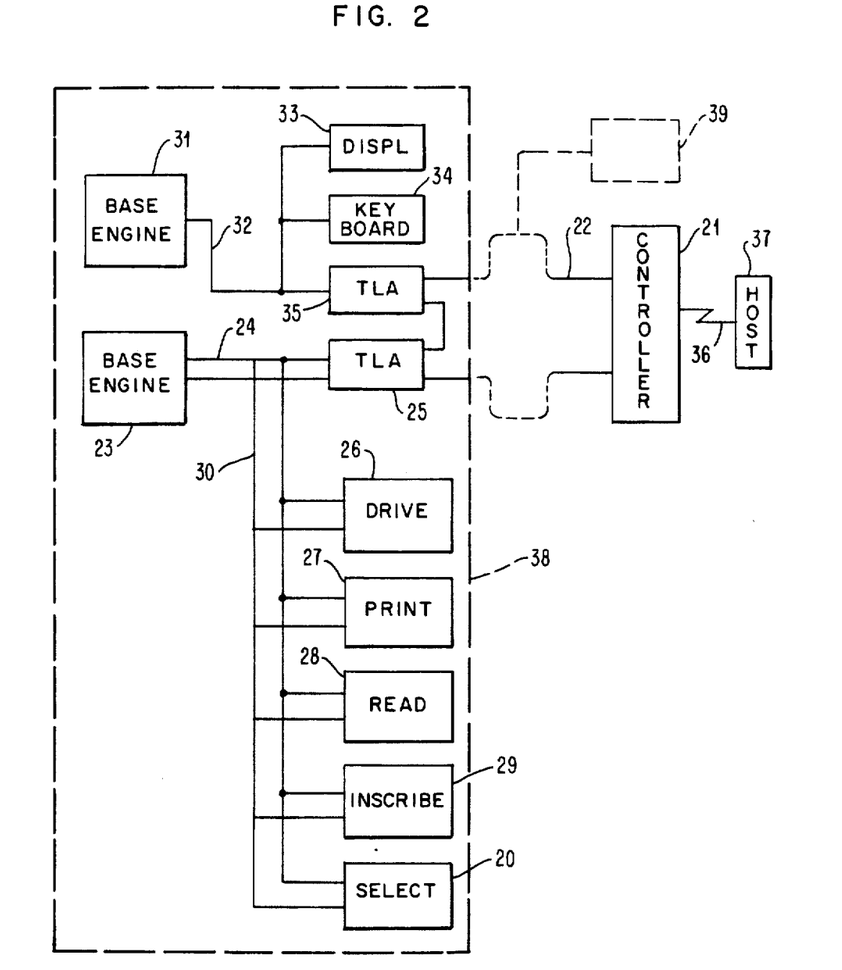
FIG. 2 is a schematic block diagram of a host/terminal system according to the present invention.

In FIG. 2 a loop controller 21 is attached to a host system 37 over a communication link 36. A plurality of work stations 38 and 39 are attached to the controller 21 over a loop 22. Each work station 38 comprises a first base engine 23 and a second base engine 31. The base engine 23 is attached over a data bus 24 and an address and control bus 30 to a transmission loop adapter 25 and to a plurality of in/out adapters 20, 26–29 for the various units in the document reader/printer of FIG. 1. The adapter 26 handles the various mechanical functions such as the drive system of the document reader; the adapter 27 is a print adapter, the adapter 28 is a read adapter, the adapter 29 is an inscriber adapter and the adapter 20 is a selecting adapter for pocket select and for selecting a stamp station.

The second base engine 31 controls a keyboard adapter 34 and a display unit adapter 33 and is attached over a bus 32 and a transmission line adapter 35 to the same loop 22.

According to another embodiment of the invention both the keyboard adapter 34 and the display adapter 33 are attached to the bus system 24 and 30 for the first base engine 23 and hence no second engine 31 is needed.

Figure 3:
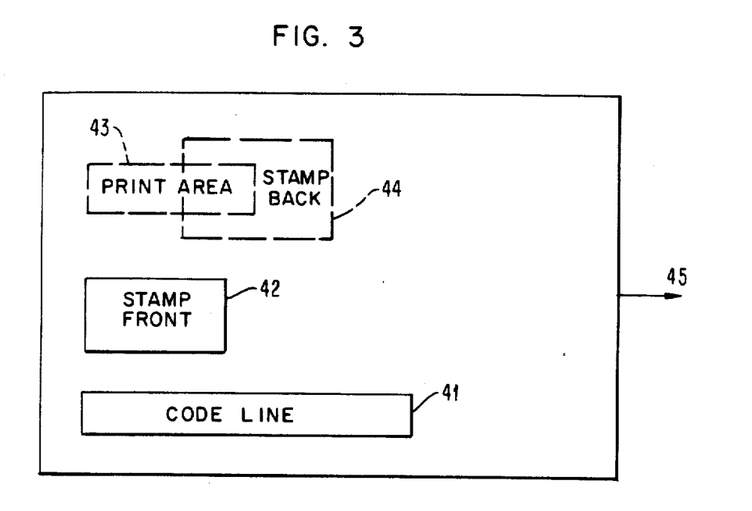
FIG. 3 is an illustration of the document to be used in the reader/printer according to FIG. 1.

FIG. 3 discloses the document 8 to be used in the reader/printer of FIG. 1. The reading station 2 reads a code line 41, the stamp front station 3 stamps an area 42 and the stamp back station 6 an area 44 on the back of the document 8. An audit printer 4 prints on the back of the document 8 within the area 43 and the inscriber 5 will print data on the code line 41. The document 8 is moving in the direction indicated by the arrow 45.

Figure 4:
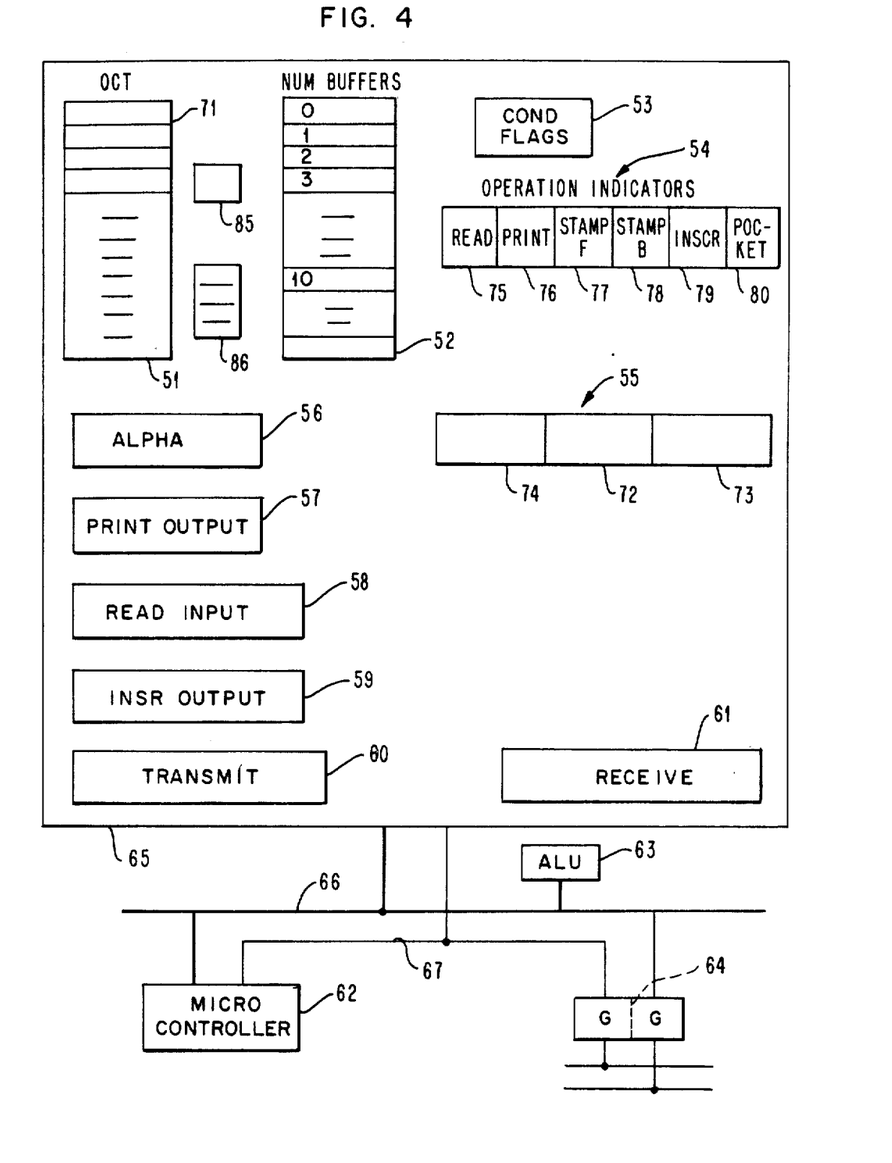
FIG. 4 is an illustration of the base engine used in the system according to FIG. 2.

The base engine 23 is disclosed in more detail in FIG. 4. A micro controller 62 is attached over a data bus 66 and an address and control bus 67 to an arithmetic logic unit 63 and to a data store 65. The internal bus system 66 and 67 is attached over a gate circuit 64 to the data bus 24 and to the address bus 30 of FIG. 2.

The store 65 comprises a number of buffers such as a receive buffer 61, a transmit buffer 60, an alphanumeric print buffer 56, a print output buffer 57, a read input buffer 58 and an inscriber output buffer 59. A plurality of numeric buffers are arranged in an area 52 and a number of format control fields are arranged in an area 55, including a code line format 74, a modifier check format 72 and a field edit format 73. The operation of the document reader/printer is controlled by an operation control table 51 comprising a number of instructions 71 and will be loaded initially from the controller 21. Each instruction 71 in the table contains condition information to be compared to condition flags stored in a register 53. The result of the operation specified in some instructions of an operation control table is stored in an operation indicator area 54 comprising a read indicator 75, a print indicator 76, a stamp front indicator 77, a stamp back indicator 78, an inscriber indicator 79 and a pocket select field 80.

An example of an operation control table is shown in the following table 1.

TABLE 1

| | |
|---|---|
| Set condition flags | 5 bytes |
| Read | 7 bytes |
| Field Edit | 3 bytes |
| Field Compare | 11 bytes |
| Modulus Check | 8 bytes |
| Stop | 3 bytes |
| Stamp Front, Back | 3 bytes |
| Print | 5 bytes |
| Inscribe | 4 bytes |
| Move Buffer | 4 bytes |
| Add Buffer | 4 bytes |
| Increment Buffer | 4 bytes |
| Set Numeric Indicator | 4 bytes |
| Pocket Select | 3 bytes |
| Repeat | 3 bytes |

These instructions are variable length instructions as indicated by the right column. The first 4 bits in the first byte of an instruction is always the operation code. All instructions are stored in consecutive locations in the control table 51.

When the instructions in the control table 51 are executed, the micro controller 62 starts the operation by accessing the first byte of the first instruction, i.e. the "Set condition flags" having an operation code "0000". It then compares this code with an instruction length table 86 and finds an instruction length of 5 bytes, which will be loaded as a pointer value into a pointer 85.

When the first instruction has been executed the pointer 85 points to the first byte of the "Read" instruction having an operation code "0001". This code is defined as a 7 byte instruction in the table 86 and hence the pointer 85 is set to 5+7=12. After the "Read" operation the micro controller 62 will access the third instruction at the location following the pointer location 12 i.e. location 13. The execution of the remaining instructions in the operation control table 51 is performed similarly.

A "Set condition flags" instruction is used to set a number of conditions flags in the area 53. The bit layout for this 5-byte instruction might be as follows:

| | |
|---|---|
| Operation code | 4 bits |
| Condition flag compare condition | 2 bits |
| Spare | 2 bits |
| Condition flags to be compared | 16 bits |
| New condition flags field | 16 bits |
| | 40 bits = 5 bytes |

A "Read" instruction is used to set the operation indicator 75 and to read the code line 41 on the document 8 when it is passing the read station 2. The code line 41 will be read into the read input buffer 58 and therefrom into a plurality of numeric buffers 52 under the control of the CLD-format area 74. The bit layout might be as follows.

| | |
|---|---|
| Operation code | 4 bits |
| Condition flag compare condition | 2 bits |
| Type of read | 2 bits |
| Condition flags to be compared | 16 bits |
| Condition flags to be set if error | 16 bits |
| Condition flags to be reset if error | 16 bits |
| | 56 bits = 7 bytes |

A "Field edit" instruction is used to transfer the contents of selected numeric buffers 52 into the transmit buffer 60 under the control of the field edit format area 73. The contents of the transmit buffer 60 will then be sent to the controller 21 over the adapter 25 and the loop 22. The code line 41 on the document 8 will thus be transferred in edited format to the loop controller 21. No condition flag set or reset bits are needed.

A "Field compare" instruction is used to compare two fields stored in two numeric buffers 52.

A "Modulus check" instruction is used to check a field in a numeric buffer under the control of the modulus check field 72 in the area 55.

A "Stop" instruction is used to stop the further processing of the operation control table if the controller 21 wants to decide how the remaining document handling should be done.

A "Stamp front, back" instruction is used to selectively set the operation indicators 77 and 78 in the area 54 in order to initiate the stamping of the area 42 or of the area 44 on the document 8. According to FIG. 1 the stamp front operation occurs in station 3 and the stamp back operation occurs in station 6.

A "Print" instruction is used to transfer a numeric buffer from the area 52 to the print output buffer 57 and to set the print operation indicator 76. This operation will initiate the printing of the contents of the print output buffer 57 within the print area 43 of the document 8 when this document is passing the print station 4.

An "Inscribe" instruction is used to transfer an arithmetic buffer from the area 52 to the inscriber output buffer 59 using the code line format 74 in the area 55. The inscriber indicator 79 will be set.

"Move buffer", and "Increment buffer" instructions are used to manipulate data in numeric buffers in the area 52 according to the instruction specification.

A "Set numeric indicator" instruction is used to display numeric information contained in the instruction itself.

A "Pocket select" instruction is used to set the correct pocket selector indicator 80 in the area 54.

A "Repeat" instruction is used to automatically initiate a new operation control table cycle without the intervention of the controller 21.

The controller 21 in FIG. 2 controls the operation of work stations, such as the station 38 and the station 39, by means of an application program containing instructions such as read, write, check etc. These instructions specify orders to be sent over the loop 22 to the work station 38 in order to control the operation of the reader/printer of FIG. 1. These orders are specified in the table 2 as follows:

TABLE 2.

Unlock
Continue
Lock
Set Buffer
Read Buffer
Set Format
Set Operation Control Table An Unlock order specifies that processing of a document should be started.

A Continue order specifies that handling of a document is to be resumed after a Stop instruction. A continue order may or may not change the condition flags stored in the register 53. It enables the loop controller 21 to decide whether a print, stamp or inscribe operation should occur for a document. The decision is based upon data read from the document and is performed by selectively changing the relevant condition flags.

A Lock order specifies that the reader/printer is prevented from accepting documents until an Unlock order has been received.

A Set Buffer order specifies that the buffer, whose number is sent together with the order, is to be loaded with data also sent with this order.

A Read Buffer order specifies that the contents of a numeric buffer in area 52, are to be sent to the controller 21.

A Set Format order will load the various format fields into the area 55.

A Set Operation Control Table order will load the operation control table into the area 51.

OPERATION OF THE INVENTION

A simplified example of the operation of the terminal system according to FIG. 2 including the reader/printer of FIG. 1 will now be described for a banking application. This operation involves operator controlled handling of a number of cheques to be processed.

Figure 5:
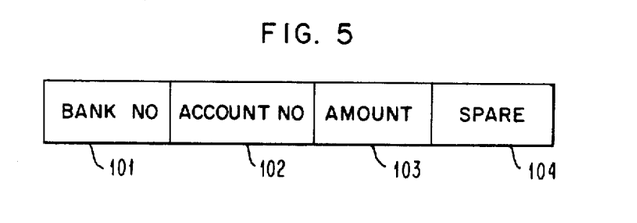
FIG. 5 is an illustration of a code line used in the document of FIG. 3.

The code line 41 of a cheque to be processed is shown in FIG. 5. The first field 101 on the code line is preprinted with a bank number. The second field 102 contains a preprinted account number. The third field 103 is to be inscribed with the amount and the fourth field 104 is a spare field. It is assumed that the cheques to be handled by the operator are of various types. The first type of cheque is an "on us" cheque, where the bank number field 101 on the code line corresponds to the originating bank. The second type of cheque is a "not on us" cheque having a bank number corresponding to another bank. The third type of cheque are those cheques, which should be rejected due to invalid identification numbers or due to non-readable code lines.

The operation starts when the operator puts the first cheque into the entry slot of the hopper 1 in FIG. 1. Then he keys in some initial information on the keyboard 34 and the amount of data for said first cheque. The loop controller 21 receives the information from the key board 32 over the loop 22 and will then initiate the operation for the reader/printer in work station 38. The application program in the controller 21 initiates a write instruction. This instruction includes a "set operation control table" order for loading the operation control table into the area 51 of the base engine 23. It further includes a "Set format" order for loading the necessary format fields into the area 55. Then there is needed a "Set buffer" order for loading the bank number of the original bank. This information can for instance be loaded into buffer number 10 in the area 52. At this state of the operation the intitial condition flags in the area 53 will also be set from the controller 21.

The operation control table loaded into the area 51 is shown in the table 3 as follows:

TABLE 3

| Condition Flags | 1 | 2 | 3 | 4 |
|---|---|---|---|---|
| 1. Set Condition Flags | C | S | R | R |
| 2. Read | C | (R) | | (S) |
| 3. Field Compare ("amount") | | C(R) | | (S) |
| 4. Field Edit | | C | | |
| 5. Field Compare ("on us") | | C | (S) | |
| 6. Modulus Check | | C(R) | | (S) |
| 7. Stop | | C(R) | | (S) |
| 8. Stamp Front | | C | | |
| Stamp Back | | | C | |
| 9. Print | | C | | |
| 10. Inscribe | | C | | |
| Select Pocket 1 | | C | | |
| 11. Select Pocket 2 | | | C | |
| Select Pocket 3 | | | | C |

C = compare
S = set
R = reset
( ) = conditional operation

After the initialization of the reader/printer the controller 21 will send an "Unlock" order to the base engine 23. The base engine 23 will then start executing the instructions in the operation control table.

Figure 6:
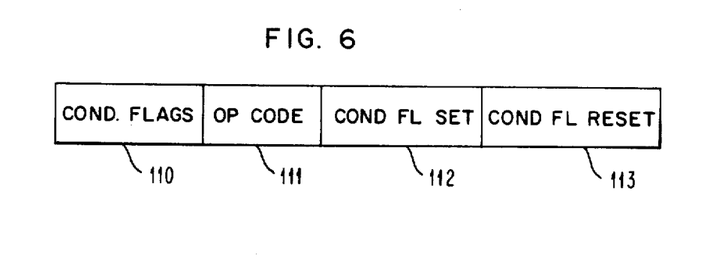
FIG. 6 is an illustration of an instruction used by the base engine of FIG. 4.

The format of an instruction in table 3 is shown in FIG. 6. The first field 110, "Condition flags" is compared to the condition flags in area 53. The second field 111 is an operation code. The third field 112 defines the setting of the condition flags in area 53 and the last field 113 defines which condition flags in the area 53 should be reset.

The first operation to be performed in the first instruction "Set condition flags" in the table 3 is to compare the contents of the field 110 with the condition flags field in the area 53. It is assumed that condition flag 1 in the area 53 is set by an initial order from the controller 21. If this comparison indicates equal the operation code in the field 111 is performed by setting the condition flag 2 and resetting the condition flags 3 and 4.

The next instruction in the table 3 is a Read. The execution of the instruction starts with the comparison of the condition flag. It is assumed that this comparison indicates equal, i.e. the condition flag 1 is set. Next the operation code 111 for the read instruction is executed and a read indicator 75 in the area 54 will be set.

In the base engine 23 the further execution of the operation control table as defined in table 3 is now temporarily terminated and control is switched over to the transport mechanism of the reader/printer. This means that the micro controller 62 of the base engine 23 signals to the document transport mechanism adapter 26 over the bus 24 and the control bus 30 to start feeding the document inserted into the start position.

Figure 7:
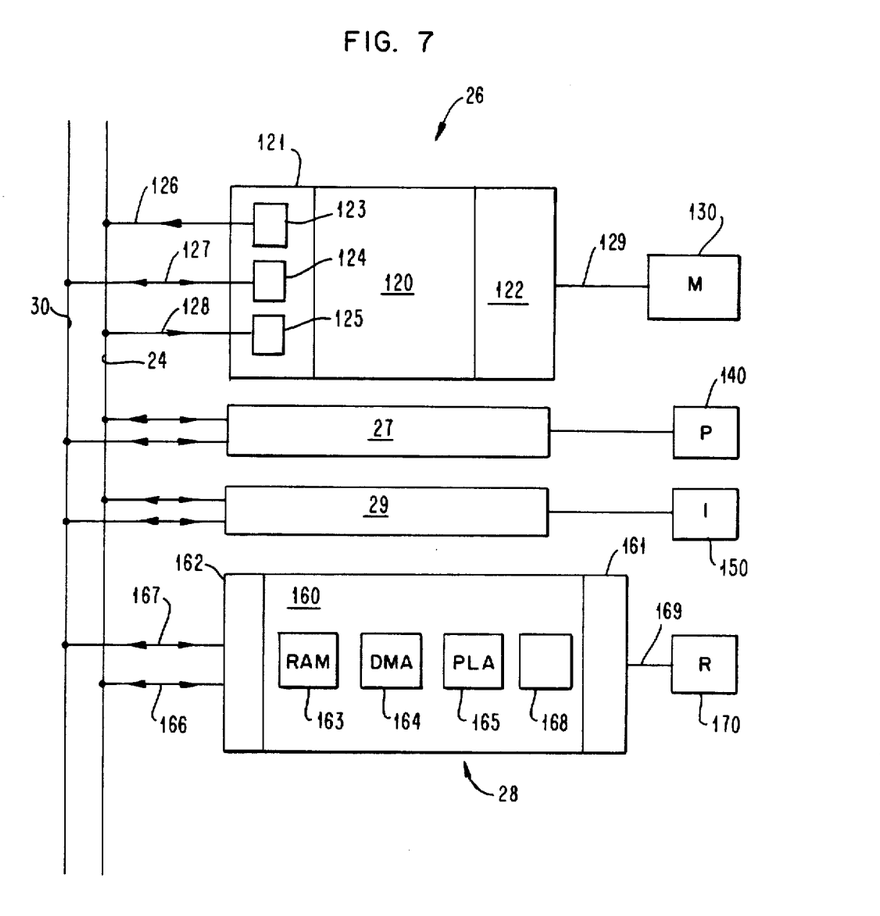
FIG. 7 is an illustration of the slave adapters used in the system according to FIG. 2.

The document transport mechanism adapter 26 is shown in more detail in FIG. 7. It includes a slave micro processor 120, an interface 121 for the bus system of the base engine 23 and an interface 122 for the document transport mechanism 130. The interface 121 comprises an input register 125 for receiving data over a line 128 from the bus 24 and an output register 123 for sending data over a line 126 to the bus 24. The interface 121 also comprises a control register 124 communicating over a line 127 with the address and control bus 30.

The micro controller 62 in the base engine 123 sends a first set of commands defining the transport motor speed and a target point along the document travel path 9. When the leading edge of a document passes the zero point sensor 14 in FIG. 1, a position counter in the micro processor 120 for the transport mechanism is set to a zero point. The transport motor 130 will now feed the document with a speed defined by the speed command to a target position defined by the target command and stop the document at the target, provided, however, that no new target commands with new target points are sent from the base engine before the document reaches the first target. The target is always defined as a distance from the zero point.

When the document passes the read station 2 of FIG. 1, the code line 41 will be read. A signal reader or a read head 170 and its adapter 28 is shown in more detail in FIG. 7. The reader 170 might be an OCR reader, an E13B magnetic ink character reader, a CMC7 code reader or any type of reader.

The adapter 28 shown in FIG. 7 is preferably used for a magnetic ink character reader. It comprises a read signal decoder unit 160 attached over an interface 162 and a line 166 to the data bus 24 and over a line 167 to the control bus 30. The unit 160 is further attached over an interface 161 and a line 169 to the reader or read head 170. The decoder unit 160 comprises a signal amplifier and analyzer circuit 168, a program logic array circuit 165 for analog to digital conversion, a direct memory access unit 164 and a random access memory module 163. The magnetic ink character signals sensed by the read head 170 are converted into digital sample signals and are transferred by the DMA circuit 164 to the RAM circuit 163. A character recognition operation is then performed by the base engine controller 62 using the character sample data stored in the RAM 163.

According to another embodiment of the invention the reader 170 is an OCR reader. Then the adapter 28 is provided with a slave microprocessor performing the complete character recognition operation in order to reduce the work load of the base engine 23.

When the code line 41 on the document 8 is read into the read input buffer 58 in the base engine 23 it might happen that some characters are not successfully recognized. This means that the document should be rejected. According to the table 3 the read instruction will then reset the condition flag 2 (R) and set (S) the condition flag 4. The purpose of the condition flag 4 is to define a reject pocket number 3 in the stacker 7 in FIG. 1. If, however, no character rejects occur during the read operation the condition flag 2 will remain set and no setting will occur for the condition flag 4.

The Read instruction in the operation control table defines a transfer of data from the read input buffer 58 to the numeric buffer area 52 using the code line definition format in the area 74.

The next instruction in the table 3 is a "Field compare", on "amount". If the condition flag 2 is still set, i.e. no character reject has occured, then this instruction will be performed. According to this instruction the amount field 103 on the code line 41, which should be empty, is compared with another empty field. This instruction is performed by comparing two buffers in the area 52, one with the amount field and the other with an empty field. If, however, this comparison indicates non equal the condition flag 2 will be reset and condition flag 4 will be set. This means that the cheque has been run for the second time through the machine and the amount field 103 has been inscribed during the first run of the cheque. Such a cheque should be selected into the reject pocket number 3 due to the condition flag 4.

The next instruction in table 3 is a "Field edit" instruction. This instruction will be performed if condition flag 2 still is set, i.e. no character reject has occured and the cheque is run through the machine the first time. This instruction specifies that a code line now stored in the numeric buffer area 52 will be transferred to the transmit buffer 60 using the field edit format 73 in the area 55. From the transmit buffer 60 the data will be transferred over the loop 22 to the controller 21 in such a format that is suitable for the controller 21.

The instruction number 5 in the table 3 is again a "Field compare" instruction defined as an "on us" instruction. This compare operation is a check on whether the document is a cheque issued by the originating bank or by another bank. This compare operation is performed only if the condition flag 2 still is set. The field compare is performed between the bank number 101 on the code line and the orginating bank number stored in a buffer in the area 52. If equal, no change will occur in the condition flags; if unequal, the condition flag 3 will be set. The purpose of the condition flag 3 is to select the document into the pocket 2 in the stacker 7. This means that all valid cheques which originated from other banks, i.e. "not on us" should be selected into the pocket 2 whereas all cheques "on us" should be selected into pocket 1.

The next instruction is a modulus check instruction which will be performed according to the modulus check format 72 in the area 55 only if the condition flag 2 is still set. The next instruction is a "Stop" instruction. It is executed only if the condition flag 2 is still set. It stops the further operation of the reader/printer in order to turn over the control of the operation temporarily to the application program in the controller 21. The controller 21 has received the code line from the transmit buffer 60 and is now capable of deciding whether the document handling should be continued. If the received data indicate that everything is OK the controller 21 will issue a "Continue" order to the base engine 23 with no changes in the condition flags. If, however, the controller 21 want to reject the document processed it will issue a "Continue" order defining the condition flag 2 to be reset and condition flag 4 to be set.

The document will be stopped due to the "Stop" instruction before it reaches the stamp front station 3. This means that the document transport adapter 26 has received a target command from the base engine 23 defining a target position before the stamp front station 3. When a "Continue" order is received from the controller 21 the base engine 23 will send a new target to the transport adapter 26.

The next instruction is a "Stamp front, Stamp back" instruction. If condition flag 3 is set the stamp back indicator 78 in the area 54 will be set but if only the condition flag 2 is set the stamp front indicator 77 will be set in the area 54. When the document reaches the stamp front station 3 and the stamp front indicator 77 is set, the stamp front station 3 will be operated via the adapter 20 so that a stamp will be set within the area 42 on the document 8. If, however, the stamp front indicator 77 is not set, no stamping will occur on the document.

The next instruction is a "Print" instruction and it is executed if the condition flag 2 is set. It sets the print indicator 76 in the area 54, and it transfers a selected field from the numeric buffer area 52 into the print output buffer 57.

The next instruction is an "Inscribe" instruction which will be executed if the condition flag 2 is on. It will set the inscriber indicator 79 in the area 54 and will transfer a selected field from the numeric buffer area 52 into the inscriber output buffer 59.

The last instruction is the "Select pocket" instruction which will set one of three indicators in the pocket select area 80. Pocket select indicator 3 will be set if the condition flag 4 is on, pocket select indicator 2 will be set if the condition flag 3 is on and pocket select indicator 1 will be set if only the condition flag 2 is on.

When the document reaches a print station 4 a field 43 will be printed from the print output buffer 57 if the print indicator 76 is set. According to FIG. 7 the print station 4 includes a printer 140 driven by a print adapter 27 comprising a slave micro processor.

When the document reaches the inscriber station 5 the amount field 103 on the code line 41 will be inscribed with the data from the instriber output buffer 59 only if the inscriber indicator 79 is set. The inscriber adapter 29 comprises a slave micro processor controlling the inscriber 150.

When the document reaches the stamp back station 6 a stamp will be put within the area 44 on the document only if the indicators 78 in the area 54 is set. When the document reaches the stacker station 7 the pocket select indicator field 80 will decide into which pocket amongst three pockets the document will be selected. The selected pocket will be activated by a signal from the base engine 23 over the adapter 20.

It will be obvious to those skilled in the art that many other types of operations can be performed by the system without departing from the scope of the invention. The operation control table can be modified by changing the instructions used and by changing the sequence of the instruction to suite another type of terminal operation.

We claim:

1. A computer terminal for connection to a host computer, said terminal including a plurality of input/output devices, an information storage comprising a buffer area and an input/output area, and a terminal processor for controlling operation of said terminal wherein, the improvement comprises:
   an operation table in said information storage, said table including a list of instructions loaded into said table from said host computer, each of said instructions having a condition field, said instructions being sequentially accessed and selectively executed by said terminal processor for controlling the operation of said input/output devices;
   a condition register in said information storage for storing condition flags to be compared by said terminal processor with condition flags in said condition field of said instructions before an operation specified by an operation code in said instructions is allowed to be executed by said terminal processor;
   a plurality of operation indicators stored in said information storage, each operation indicator settable by said terminal processor as said operation code of a corresponding one of said instructions is executed, said operation indicators controlling data transfer between said input/output area and said plurality of input/output devices by said terminal processor asynchronously with execution of said instructions in said operation table.

2. The terminal of claim 1 further comprising:
   a document hopper, a read station and a document feeding mechanism connected to said terminal processor for feeding a document along a path from said hopper through said read station to a stacker an indefinite period of time after said terminal processor has executed a read instruction of said instructions and has set a read indicator of said operation indicators.

3. The terminal of claim 2 further comprising a recording station along said path, said recording station being connected to said terminal processor for recording information on a document as said document passes said recording station an indefinite period of time after said terminal processor has executed a record instruction of said instructions and has set a record indicator in said information storage.

4. The terminal of claim 3 further comprising means responsive to a stop instruction in said operation table for halting the sequential accessing and selective execution of instructions in said operation table until a continue order is received from said host computer.

* * * * *